Nov. 14, 1950 — D. FIRTH — 2,530,052

BEARING SEAL

Filed Feb. 4, 1948 — 2 Sheets-Sheet 1

INVENTOR.
David Firth
BY Osgood H. Howell
Atty.

Nov. 14, 1950     D. FIRTH     2,530,052
BEARING SEAL
Filed Feb. 4, 1948     2 Sheets-Sheet 2
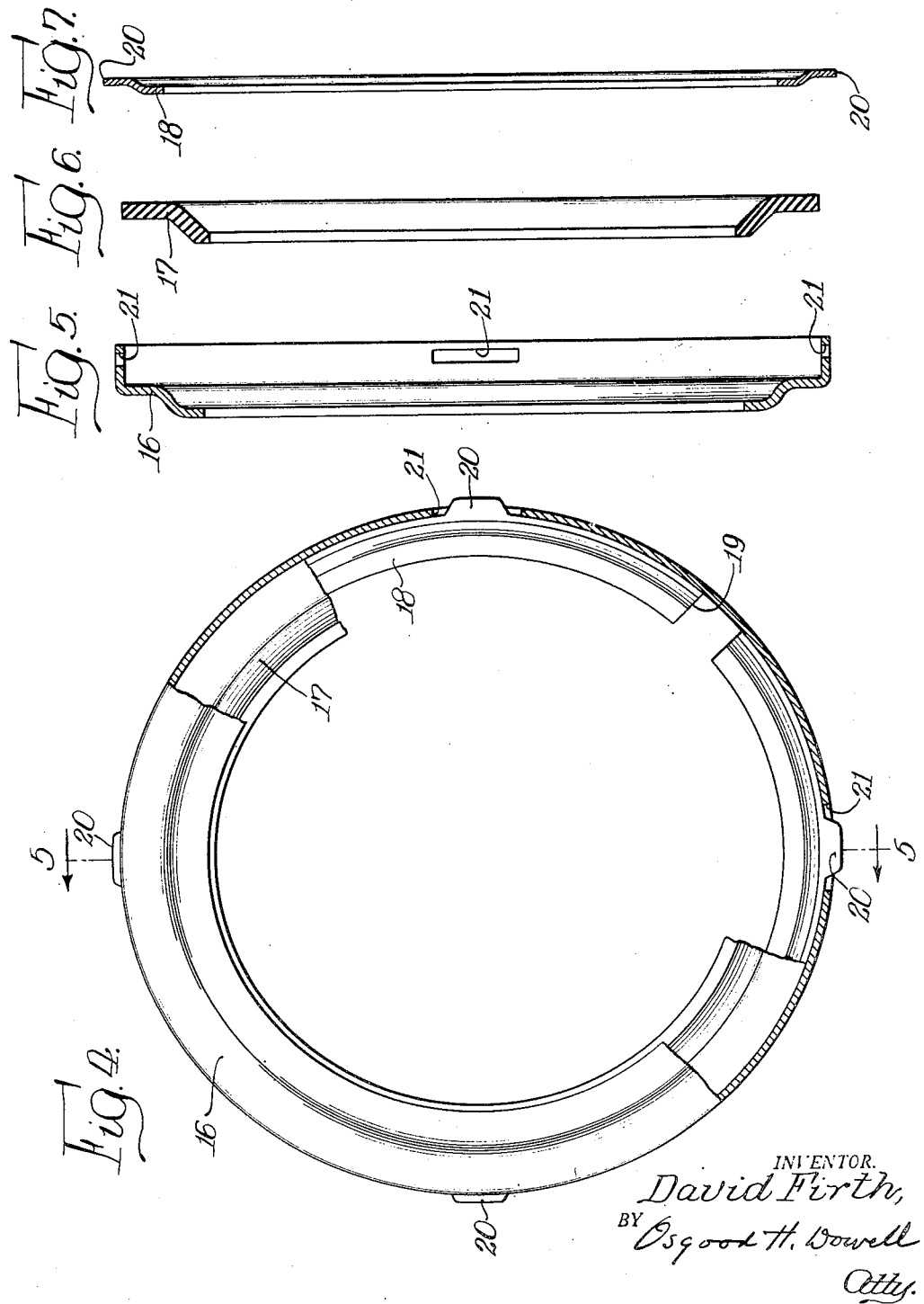
INVENTOR.
David Firth,
BY Osgood H. Dowell
Atty.

Patented Nov. 14, 1950

2,530,052

UNITED STATES PATENT OFFICE 2,530,052

BEARING SEAL

David Firth, South Bend, Ind., assignor to Dodge Manufacturing Corporation, Mishawaka, Ind., a corporation of Indiana Application February 4, 1948, Serial No. 6,141

4 Claims. (Cl. 288—3)

This invention relates to sealed anti-friction shaft bearings and seals therefor.

An object of the invention is to provide an annular antifriction bearing unit sealed by seals of practicable construction forced into and snap-locked in the outer member of such unit.

More broadly, the general object of the invention is to provide a sealed antifriction shaft bearing improved with respect to the sealing means, having in view practicability and dependability of the sealing means, ready application thereof to the bearing, and prevention of displacement of the sealing means by pressure of grease when forced into the sealed bearing by a grease gun.

The invention embraces a novel seal, and a bearing sealed by such seal or seals.

For illustration, there is shown in the accompanying drawings one type of antifriction shaft bearing containing an embodiment of the invention in one practicable form.

Figure 1:
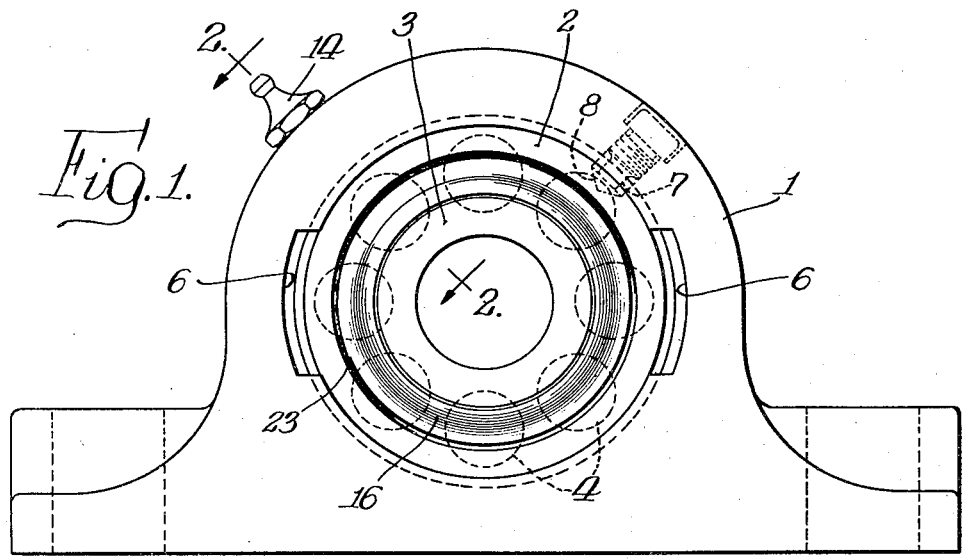
Fig. 1 is a front elevation of the illustrative bearing.
Figures 2, 2A, 3:
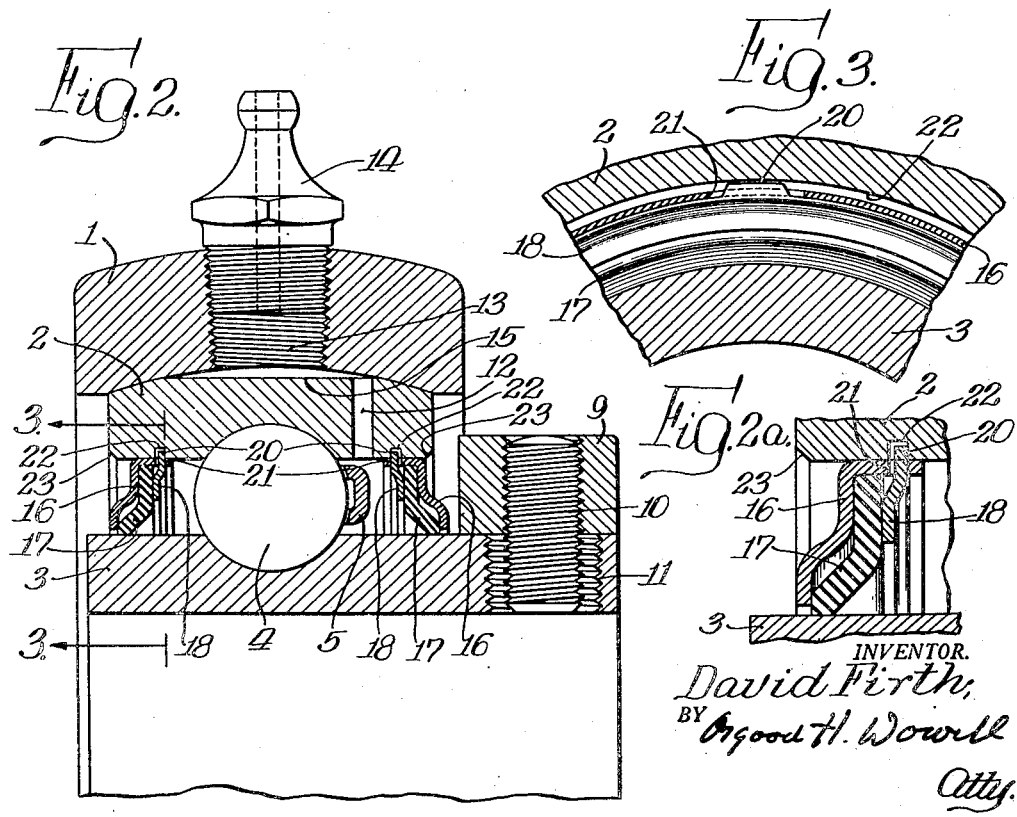
Fig. 2 is an enlarged section on the line 2—2 of Fig. 1.

Fig. 2ª is an enlarged fragment of Fig. 2.

Fig. 3 is a section on the line 3—3 of Fig. 2.

Fig. 4 is a front elevation of a seal, parts thereof being broken away to reveal other parts.

Figs. 5, 6 and 7 are sectional views of the several rings composing the seal, the sections being taken on the line 5—5 of Fig. 4. Fig. 5 shows the retaining ring, Fig. 6 the rubber sealing ring which fits therein, and Fig. 7 the spring locking ring.

The structure selected for illustration is a self-aligning antifriction shaft bearing of a general construction somewhat similar to that shown in my pending application Serial No. 613,471, filed August 30, 1945.

Mounted in the housing 1 is a sealed annular antifriction bearing unit whose outer race ring 2 has a spherical periphery fitting the interior spherical surface of the housing, so that the bearing unit can move angularly about its spherical center to adapt itself to shaft alignment. The housing may be a one-piece housing having its interior cylindrical surface cut by confronting longitudinal grooves 6 through which the bearing unit can be introduced into the housing in a manner well understood in the art. The bearing unit may be retained against withdrawal by a radially disposed pin 7 removably fixed in the housing and protruding into a socket or recess 8 in the outer race ring 2, thereby limiting angular movements of the bearing unit and rotative movements of the outer race ring on its own axis, and thus preventing creeping of said outer race ring in the direction of shaft rotation.

The antifriction bearing unit is shown as a ball bearing unit comprising said outer race ring 2, the inner race ring 3, and an interposed annular series of balls 4 running in confronting grooves in said race rings. A ball-separating cage or spacing device is indicated at 5 in Fig. 2.

The inner race ring 3, which is to be mounted on and fixed to the shaft to which the bearing is to be applied, is shown as elongated and bored to fit such shaft. Fitted on the extension of said race ring is a removable collar 9 of unhardened metal, in which are two radially disposed set screws 10 arranged preferably about 120 degrees apart. These set screws (only one of which is shown) are threaded in the collar and pass loosely through the larger threaded holes 11 in said extension of said race ring. By tightening said screws against the shaft (not shown), said inner race ring can be fastened to the shaft by the clamping of the extension of said race ring between the shaft and said collar. If preferred, the collar 9 may be omitted and the inner race ring may be fastened to the shaft by larger set screws engaging in the threaded holes 11 and tightened against the shaft.

The antifriction bearing unit is sealed by seals arranged between the outer and inner race rings. Lubricant can be introduced into a duct 12 in the outer race ring communicating with a grease chamber 13 into which the grease can be forced through a fitting 14 screwed into the housing 1. In this instance the outer race ring 2 has its spherical periphery slightly truncated to form a circular flat surface 15 arranged opposite said fitting and forming the bottom of said grease chamber, whereby the duct 12, drilled through said race ring from the outer part of said flat surface, is located between the balls 4 and one of the bearing seals.

Reference will now be made to the bearing seals and the manner in which they are arranged and retained in the bearing unit.

An individual seal comprises a cup-shaped retaining ring 16, a sealing ring 17 of rubber or the like fitted in the retaining ring, and a spring ring 18 fitted in the retaining ring behind the rubber sealing ring and pressing the latter against the web of said retaining ring.

The retaining ring 16 is made as a sheet-metal stamping in the form of an annular radially extending web having a cylindrical flange bent from its periphery. The front of the seal is formed by said web from which said flange extends rearwardly or axially inwardly. By forming said web with adjacent reversely shaped annular bends as shown, the retaining ring is rigidified and its central portion is axially offset forwardly from the outer flat portion of said web. Said retaining ring is fitted tight in the outer race ring 2, being preferably of an original diameter one or two thousandths of an inch larger than the inside diameter of said race ring and pressed thereinto so as to have a press-tight fit therein. The central opening of said retaining ring is of a diameter somewhat larger than the diameter of the inner race ring 3, so as to provide therebetween a small clearance say of from one thirty-secondth to a sixteenth of an inch, so that to an observer looking at the end of the bearing unit it appears to be neatly closed by said retaining ring, though actually there is no contact between said retaining ring and the inner race ring.

The rubber sealing ring 17, fitting loosely in the flange of the retaining ring 16, has a flat outer portion in contact with the flat outer portion of the web of the retaining ring, and is preferably formed so as also to bear flatwise against the central portion of said retaining ring. In the form shown, the sealing ring 17 has its inner portion formed to provide an axially offset annular flat face in contact with said central portion of the retaining ring. The sealing ring is of appropriate inside diameter to fit on the inner race ring 3 in contact therewith, or it may be of an inside diameter slightly less than the diameter of said inner race ring so as to hug the same with slight pressure. The inner portion of the sealing ring is preferably formed so that its inner periphery is provided by a very narrow cylindrical surface, for minimizing the surface thereof in engagement with the rotating race ring 3. By frictional engagement of the sealing ring 17 with the web of the retaining ring 16, said sealing ring is held stationary while the race ring 3 rotates therein.

A molded ring of synthetic rubber such for example as neoprene rubber is preferably utilized as a sealing ring. Neoprene rubber, though yieldable and elastic, is desirably firmer, harder and stiffer than ordinary or natural rubber. It molds with a smooth surface and is grease-resistant, so that it will wear a long while without becoming seriously objectionally affected by grease.

The sealing ring may however be of any appropriate rubber compound or rubber-like material or non-metallic elastic material suitable for the purpose of a sealing ring. Nor is the invention intended to be limited to the use of a molded rubber ring.

The spring ring 18 is a split contractible resilient ring fitting within the peripheral flange of the retaining ring 16 and having radiating tabs or projections 20 protruding through correspondingly arranged circumferential slots 21 in said flange. The split or gap in said spring ring 18 is shown at 19 in Fig. 4. In the assembled seal, the rubber sealing ring 17 is squeezed between the web of the retaining ring 16 and said spring ring 18, the tabs 20 of which abut against the rear edges of the slots 21. The spring ring 18 may be made as a sheet-metal stamping in the form of a radially extending web having adjacent reversely arranged annular bends rigidifying the ring and axially offsetting the inner portion forwardly from its outer portion. Said forwardly offset inner portion of the spring ring is spaced from the web of the retaining ring 16 a distance less than the thickness of the rubber sealing ring, so that said spring ring 18 when in place is stressed and resiliently presses the rubber ring against said web of the retaining ring. The tabs 20 protrude slightly beyond the retaining ring into an internal annular groove 22 in the outer race ring 2, whereby the seal is locked in the bearing unit.

The foregoing description of an individual seal applies to both seals in the illustrative structure. The seals are assembled before insertion in the antifriction bearing unit. Each seal is assembled by placing the rubber ring 17 within the retaining ring 16, contracting the spring ring 18 and placing it in the retaining ring with the tabs 20 in registration with the slots 21, and then allowing said spring ring to expand. The pre-assembled seals are forced into place in the outer race ring 2 which is shown counterbored at its ends to form beveled surfaces 23. As the seals are forced into the outer race ring, the tabs 20 are depressed within the slots 21 by engagement with the beveled surfaces 23, and when the seal is in place the tabs 19 snap into the grooves 22, thus locking the seals against dislodgement.

It is customary to counterbore outer race rings as shown at 23, but even if the outer race ring should not be so counterbored the seals can be forced into place by depressing the tabs 20 with a suitable tool as the seals are inserted into the race ring and then forcing the seals to position for the tabs to snap into the groove 22.

The seals protect the bearing from entrance of dust or grit thereinto and confine the grease therein when the grease is not under pressure, but permit the expulsion of old grease by new grease under pressure. That is to say, if the bearing is full of grease and more grease is forced thereinto by a grease gun, thus creating a substantial pressure in the bearing unit, the inner edge portion of the rubber seal will yield outwardly sufficiently to permit expulsion of old grease.

The invention may be applied to anti-friction shaft bearings of other types than that illustrated, including bearings which require sealing at only one end. In the case of an ordinary non-self-aligning bearing whose outer race ring fits in an interiorly cylindrical housing, the bearing may be sealed by seals of the construction hereinbefore described arranged between the housing and extensions of the inner race ring. So also in the case of a self-aligning bearing whose outer race ring is exteriorly cylindrical and fits in an interiorly cylindrical inner housing, the latter being exteriorly spherical and fitting in an interiorly spherical outer housing, the bearing may be sealed by such seals arranged between the inner housing and extensions of the inner race ring. Therefore in the following claims the expression "concentric outer and inner annular bearing members" is used with reference to the members between which the seals are arranged, whether said members be the race rings or otherwise.

I claim:

1. A bearing seal comprising a retaining ring having an annular web and a peripheral cylindrical flange, a sealing ring fitting in said retaining ring, and a split contractible resilient ring fitting in and connected with said flange and pressing said sealing ring against said web, said resilient ring having radiating projections and said flange having correspondingly arranged holes through which said projections protrude.

2. A bearing seal comprising a retaining ring having an annular web and a peripheral cylindrical flange, a sealing ring fitting in said retaining ring, and a split contractible resilient ring fitting in and connected with said flange and pressing said sealing ring against said web, said resilient ring being a sheet-metal stamping in the form of an annular web having radiating flat tabs and said flange having correspondingly arranged circumferentially extending slots through which said tabs protrude.

3. A bearing seal comprising a retaining ring having an annular web and a peripheral cylindrical flange, a sealing ring fitting in said retaining ring, and a split contractible resilient ring fitting in and connected with said flange and pressing said sealing ring against said web, said resilient ring being a sheet-metal stamping in the form of a web having radiating tabs and having annular bends rigidifying the ring and offsetting its inner portion axially forwardly, said flange having circumferentially extending slots through which said tabs protrude.

4. A bearing seal comprising a cup-shaped retaining ring, a sealing ring fitting therein, said retaining ring having an annular web and a peripheral flange and having a plurality of suitably angularly spaced openings in said flange, and a split contractible resilient locking ring fitting in said retaining ring and having radiating projections protruding through said openings, said sealing ring being between said web and locking ring.

DAVID FIRTH.

REFERENCES CITED

The following references are of record in the file of this patent:

UNITED STATES PATENTS

| Number | Name | Date |
| --- | --- | --- |
| 2,029,072 | Hughes | Jan. 28, 1936 |
| 2,172,280 | Helfrecht | Sept. 5, 1939 |
| 2,276,225 | Carter | Mar. 10, 1942 |

FOREIGN PATENTS

| Number | Country | Date |
| --- | --- | --- |
| 10,575 | Great Britain | of 1905 |
| 546,260 | Great Britain | July 3, 1942 |